United States Patent
Convery (10) Patent No.: US 11,471,793 B2
(45) Date of Patent: Oct. 18, 2022

(54) METHOD AND APPARATUS FOR REDUCING THE WATER CONTENT OF WASTE WATER SLUDGE

(71) Applicant: CDE Global Limited, Cookstown (GB)

(72) Inventor: Anthony Convery, Moneymore (GB)

(73) Assignee: CDE Global Limited, Cookstown (GB)

( * ) Notice: Subject to any disclaimer, the term of this patent is extended or adjusted under 35 U.S.C. 154(b) by 0 days.

(21) Appl. No.: 17/290,010

(22) PCT Filed: Oct. 9, 2019

(86) PCT No.: PCT/EP2019/077422
§ 371 (c)(1),
(2) Date: Apr. 29, 2021

(87) PCT Pub. No.: WO2020/088904
PCT Pub. Date: May 7, 2020

(65) Prior Publication Data
US 2022/0001305 A1 Jan. 6, 2022

(30) Foreign Application Priority Data
Oct. 29, 2018 (GB) ..................................... 1817632

(51) Int. Cl.
*B01D 21/24* (2006.01)
*B01D 21/00* (2006.01)
(Continued)

(52) U.S. Cl.
CPC ..... *B01D 21/0024* (2013.01); *B01D 21/0012* (2013.01); *B01D 21/245* (2013.01);
(Continued)

(58) Field of Classification Search
CPC ............ B01D 21/0012; B01D 21/0024; B01D 21/2444; B01D 21/245; B01D 21/302; B01D 21/32; B01D 21/34; C02F 11/121
(Continued)

(56) References Cited

U.S. PATENT DOCUMENTS 3,835,045 A * 9/1974 Hussissian ......... B01D 21/0012
210/709
4,348,279 A * 9/1982 Tikhonov ............. B01D 21/302
210/533
(Continued)

FOREIGN PATENT DOCUMENTS

| CN | 201592006 | 9/2010 |
|----|-----------|--------|
| CN | 202212034 | 5/2012 |

(Continued)

OTHER PUBLICATIONS

International Search Report of corresponding PCT Application No. PCT/EP2019/077422, dated Jan. 23, 2020.
(Continued)

*Primary Examiner* — Christopher Upton
(74) *Attorney, Agent, or Firm* — Gardner, Linn, Burkhart & Ondersma LLP (57) ABSTRACT

An apparatus for reducing the water content of waste water sludge includes a column for receiving waste water sludge, an outlet at a lower end of the column, a first closure for closing the outlet of the column, a controller for controlling the opening and closing of the closure. The controller is adapted to open and close the first closure to periodically discharge amounts of settled fines from the lower end of the column. A water outlet is adapted to receive water overflowing from an upper end of the column.

23 Claims, 6 Drawing Sheets

(51) Int. Cl.
*C02F 11/121* (2019.01)
*B01D 21/30* (2006.01)
*B01D 21/34* (2006.01)

(52) U.S. Cl.
CPC ..... *B01D 21/2427* (2013.01); *B01D 21/2444* (2013.01); *B01D 21/2455* (2013.01); *B01D 21/302* (2013.01); *B01D 21/34* (2013.01); *C02F 11/121* (2013.01)

(58) Field of Classification Search
USPC .......... 210/744, 803, 112, 113, 533, 536
See application file for complete search history.

(56) References Cited

U.S. PATENT DOCUMENTS

| | | | | |
|---|---|---|---|---|
| 5,078,861 | A * | 1/1992 | Krofta | B01D 21/34 210/744 |
| 6,261,462 | B1 * | 7/2001 | Batten | B01D 17/0214 210/533 |
| 7,547,397 | B1 * | 6/2009 | Liu | B01D 21/34 210/803 |
| 8,623,221 | B1 * | 1/2014 | Boyd | B01D 21/2405 210/803 |
| 2004/0020860 | A1 | 2/2004 | Schmigel et al. | |
| 2017/0081426 | A1 | 3/2017 | Larry et al. | |

FOREIGN PATENT DOCUMENTS

| | | |
|---|---|---|
| CN | 203700005 | 7/2014 |
| CN | 107362591 | 11/2017 |
| DE | 2009651 | 11/1970 |
| FR | 2247427 | 5/1975 |
| JP | 5742309 | 3/1982 |
| JP | 2000051613 | 2/2000 |
| WO | 2011035377 | 3/2011 |

OTHER PUBLICATIONS

UK Search Report of corresponding Application No. GB1817632.1, dated May 16, 2019.

* cited by examiner

METHOD AND APPARATUS FOR REDUCING THE WATER CONTENT OF WASTE WATER SLUDGE

CROSS REFERENCE TO RELATED APPLICATIONS

The present application is a § 371 national stage of International Application PCT/EP2019/077422, filed Oct. 9, 2019, which claims priority benefit to U.K. Pat. Application Ser. No. 1817632.1, filed Oct. 29, 2018, both of which are hereby incorporated herein by reference in their entireties.

FIELD OF THE INVENTION

This invention relates to a method and apparatus for reducing the water content of waste water sludge and in particular to a method and apparatus for reducing the water content of sludge from settlement or thickener tanks to permit recycling of the water. The term "waste water sludge" is used herein to describe waste water containing a relatively high proportion of fine suspended solids, such as silt or other fine contaminants.

BACKGROUND OF THE INVENTION

Waste water streams containing entrained solid impurities and contaminants in suspension are produced from numerous quarrying, mining, chemical or industrial processes. It is often desirable to reuse such water, particularly in regions prone to water shortages.

Before the waste water can be reused, the solid impurities and contaminants (referred to as "fines") must be removed from the water, which is typically in the form of waste sludge from various treatment processes.

A particularly difficult waste water source to deal with is the overflow from hydrocyclones, which, as well as containing a lot of water, also contains very fine solid particles suspended therein. Water is recycled from such material by the use of settlement or thickener tanks, wherein solids collect in the bottom of the tank as a sludge, typically through the use of flocculants. The sludge from the bottom of the settlement or thickener tank is typically dewatered by pressing the material to squeeze out the water while retaining the fines in a filter press or belt press. However, the very fine solid material contained in the sludge tends to rapidly block such filtration materials. Furthermore, such belt filters or filter presses tend to be expensive to operate, having high energy consumption.

SUMMARY OF THE INVENTION

According to the present invention there is provided an apparatus for reducing the water content of waste water sludge comprising a column for receiving waste water sludge, an outlet at a lower end of the column, a first closure for closing the outlet of the column, a controller for controlling the opening and closing of the closure, the controller being adapted to open and close the first closure to periodically discharge amounts of settled fines from the lower end of the column, and a water outlet adapted to receive water overflowing from an upper end of the column.

The apparatus may further comprise a second closure located above the first closure, the controller being adapted to close the second closure before or when opening the first closure to retain waste water sludge in the column above the second closure while settled fines below the second closure are discharged from the lower end of the column.

Optionally, the first and/or second closures comprise gate valves.

The apparatus may further comprise a sensor device for determining the level of settled fines within the column, the controller being adapted to control opening and closing of the first closure as a function of the level of settled fines within the column. The controller may be programmed to open the first closure to discharge settled fines from the lower end of the column when the sensor device determines that the level of settled fines is at a predetermined level within the column.

In one embodiment the controller may be adapted to close the second closure when the sensor determines that the level of settled fines is at the predetermined level within the column. The predetermined level may optionally be at or above the position of the second closure within the column.

The sensor may have one or more optical sensors detecting light transmission within the column; a torque sensor for determining the torque applied to paddles or similar stirring devices located at a predetermined height within the column; and a weighing device for determining the weight of settled fines within a lower end of the column.

The water outlet may communicate with a peripheral weir at an upper end of the column. The water outlet may be provided in a peripheral water collection chamber extending around an upper end of the column.

In one embodiment an inlet pipe may extend downwardly into an upper end of the column for delivering waste water sludge into the column with reduced turbulence and to prevent suspended solids from passing out of the water outlet. The inlet pipe may be arranged concentrically within the column.

In one embodiment the column is defined by a tubular pipe having a constant diameter and/or cross sectional area along its length.

In one embodiment the column may be mounted substantially vertically on a support frame.

A porous barrier may be provided for selectively closing a lower end of the column, the porous barrier communicating with a pressure reduction device for drawing water out of a lower end of the column through the porous barrier while retaining settled fines within the column. The controller may be adapted to bring the porous barrier into a position against the lower end of the column, retaining settled fines within the column, when the second closure is closed and the first closure is open to reduce the water content of settled fines located in the column below the second closure and to subsequently displace the porous barrier away from the lower end of the column to permit discharge of the settled fines from the column. In one embodiment, the porous barrier may be defined by a belt of an endless belt conveyor adapted to receive and carry settled fines discharged from the lower end of the column.

According to a further aspect of the present invention there is provided a method for reducing the water content of waste water sludge include the steps of delivering waste water sludge into a column having an outlet at a lower end of the column and a first closure for closing the outlet of the column, permitting fines to settle to a lower end of the column and periodically opening the first closure to discharge amounts of settled fines from the lower end of the column while collecting water overflowing from an upper end of the column.

The method may further comprise the step of closing a second closure located in the column above the first closure when or before opening the first closure to retain waste water sludge in the column above the second closure while settled fines are discharged from the column.

The method may comprise step of closing a lower end of the column with a porous barrier communicating with a pressure reduction device for drawing water out of the settled fines through the porous barrier to reduce the water content of the settled fines before discharging the settled fines from the lower end of the column.

The first closure may be opened to discharge an amount of settled fines from the lower end of the column when the sensor determines that the settled fines have reached a predetermined level within the column.

The second closure may be closed to retain waste water sludge within the column and the first closure is opened to discharge an amount of settled fines from the lower end of the column when the sensor determines that the settled fines have reached a predetermined level within the column.

In one embodiment, the predetermined level is at or above the level of the second closure.

These and other objects, advantages and features of the invention will become apparent upon review of the following specification in conjunction with the drawings.

BRIEF DESCRIPTION OF THE DRAWINGS

An embodiment of the present invention will now be described, by way of example and with reference to the accompanying drawings, in which:—

DETAILED DESCRIPTION OF THE PREFERRED EMBODIMENTS

An apparatus for reducing the water content of waste water sludge in accordance with an embodiment of the present invention, as illustrated in FIGS. 1-8, comprises a vertically mounted hollow pipe defining a column 2 for receiving waste water sludge via a coaxially arranged inlet tube 4 extending into an open upper end of the column 2 (FIG. 4) to reduce turbulence within the column and prevent suspended fines from being discharged from an upper end of the column. A buffer tank 6 (FIGS. 1-6) is mounted above the inlet tube 4 having an inlet 8 in an upper part of a side wall thereon and an outlet 10 at a lower end of the buffer tank 6 to minimise turbulence of the waste water sludge entering the column 2 to facilitate the settling of suspended fines from the waste water in the column 2. A shield 12 (FIGS. 4 and 5) may be located over the inlet of the buffer tank to further reduce turbulence. Optionally, the pipe has a substantially constant diameter and/or cross sectional area along its length.

The upper end of the column defines a weir 14 (FIGS. 4 and 5) over which clean water may overflow from the column 2, such water being collected in a peripheral water collection chamber 16 located around the upper end of the column 2 and optionally having a side wall extending about the upper end of the column. A drain outlet 18 (FIG. 4) is provided in a bottom wall of the water collection chamber 16 for removing water for disposal or reuse.

A pair of vertically space first and second gate valves 20, 22 are provided at a lower end of the column 2 (FIGS. 1, 3, and 6-8), each gate valve 20, 22 having a valve member slidable between an open position, wherein the column is substantially unobstructed by the valve member, and a closed position, wherein the valve member blocks the column. Respective solenoid actuators 24, 26 (FIGS. 6-8) are provided for opening and closing each gate valve 20, 22.

The first gate valve 20 is provided adjacent a bottom end of the column and, when in a closed position, retains waste water sludge within the column, allowing fines to settle out of suspension to collect in a lower end of the column against the first gate valve 20. The second gate valve 22 is located above the first gate valve 20. The second gate valve 22 can be closed to retain waste water sludge within the column 2 while the first gate valve 20 is opened to discharge settled fines collected in the column in the space between the first and second gate valves 20, 22. At least a lower portion of the column may be frustoconically shaped, with an increasing diameter towards the lower end of the column, to facilitate discharge of collected solids therefrom.

A sensor 27 (FIGS. 6 and 7) may be provided for determining the level of settled fines within the column 2. In the embodiment shown, the sensor 27 may comprise one or more optical sensors adapted to measure or detect light transmission through the column. A transparent viewing window 28 (FIG. 7) is optionally provided in the side wall of the column 2 to permit optical sensors to be located on the outside of the column. Alternatively the level of settled fines within the lower end of the column may be monitored by sensing the torque demand of stirring paddles located within the column or by means of load cells determining the weight of collected fines in the lower end of the column.

A controller (not shown) is provided for controlling the operation of the gate valves 20, 22 to periodically remove amounts of settled fines from the lower end of the column 2, as will be described below in more detail.

In one embodiment, in use, waste water sludge, or other liquid containing suspended fine solid material, is passed into the column 2, via the buffer tank 6 and inlet tube 4. At such time the second gate valve 22 is open and the first gate valve 20 is closed to allow the fines to settle out of suspension and collect in the bottom of the column 2, against the closed first gate valve 20, while relatively clean water overflows over the weir 14 at the upper end of the column 2 to be collected in and subsequently discharged from the water collection chamber 16 via the drain outlet 18 thereof.

When the sensor or sensors 27 detect that the collected solid material within the lower end of the column has reached a predetermined level within the column 2, which may optionally be close to but above the second gate valve 22, the controller is programmed to close the second gate valve 22, retaining the sludge above the second gate valve 22 within the column 2, and open the first gate valve 20 to permit the collected fines located within the column 2 below the closed second gate valve 22 to be discharged from the lower end of the column 2. At least the portion of the column 2 between the first and second gate valves 20, 22 may be frustoconically shaped (i.e. wider at the bottom than the top) to facilitate discharge of the settled fines from the portion.

A conveyor (not shown) may be positioned below the column 2 for receiving and removing the discharged fines. Alternatively the collected fines may be received by a hopper or bin located beneath the lower end of the column.

After a predetermined period of time, sufficient for the discharge of the collected fines, the controller closes the first gate valve 20 once again and opens the second gate valve 22 to allow a further batch of fines to settle within the column against the closed first gate valve before the process repeats to remove a further amount of settled fines.

While the use of sensors 27 is described to determine when the level of settled fines reach a predetermined level within the column 2 to enable the controller to control the removal of the settled fines from the column 2 by means of the first and second gate valves 20, 22, it is envisaged that the controller may be programmed to operate the first and second gate valves 20, 22 to periodically discharge amounts of settled fines from the column 2 without the use of sensors 27 using a timer, wherein the gate valves 20, 22 are opened and closed after predetermined time periods determined sufficient for the required level of settled fines to be reached within the lower end of the column 2.

In order to further reduce the water content of the fines removed from the column 2, it is envisaged that a porous barrier 30 (FIG. 2), optionally communicating with a vacuum, for example by means of a vacuum pump, may be selectively brought into abutment with the lower end of the column 2 with the second gate valve 22 closed and the first gate valve 20 open, drawing water through the porous barrier 30 while the barrier 30 serves to retain the collected solids within the lower end of the column. After a suitable period of time the porous barrier 30 may be withdrawn to allow the dewatered settled fines to be discharged from the lower end of the column.

Figure 1:
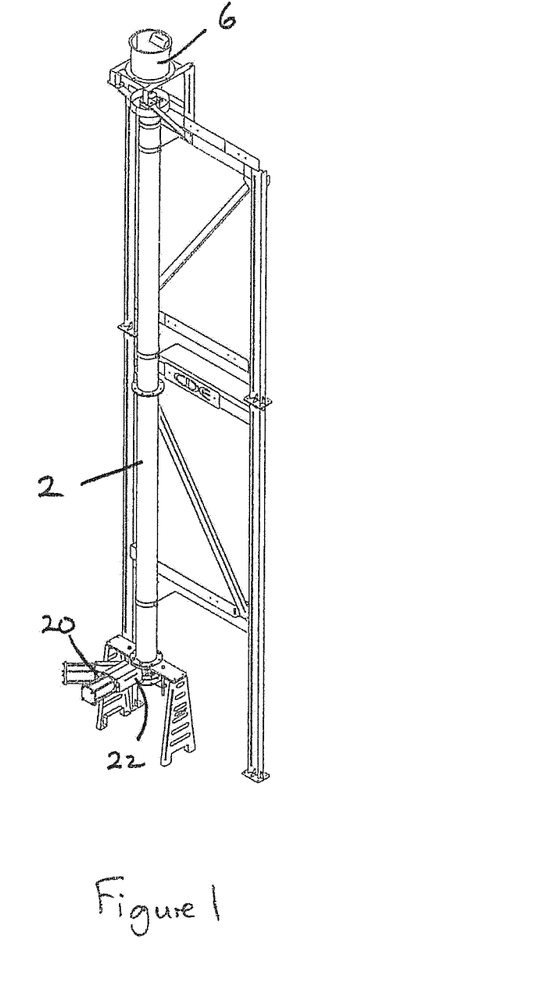
FIG. 1 is a perspective view of an apparatus for reducing the water content of waste water sludge in accordance with an embodiment of the present invention.
Figure 2:
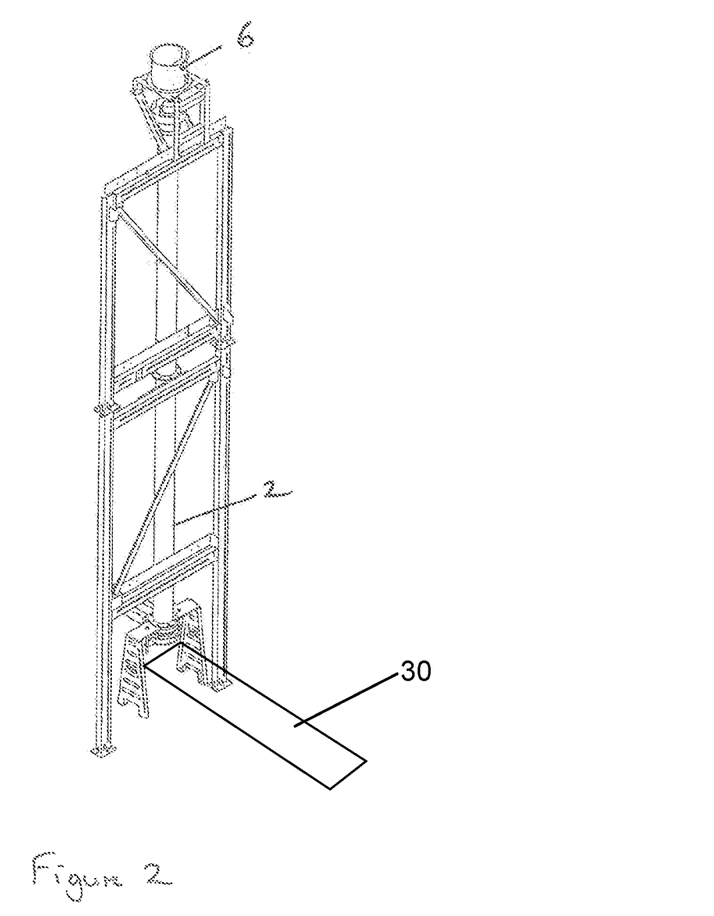
FIG. 2 is a further perspective view of the apparatus of FIG. 1.
Figure 3:
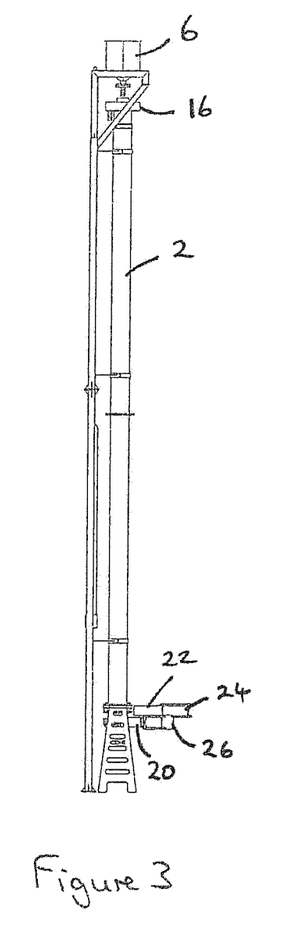
FIG. 3 is a side view of the apparatus of FIG. 1.
Figure 4:
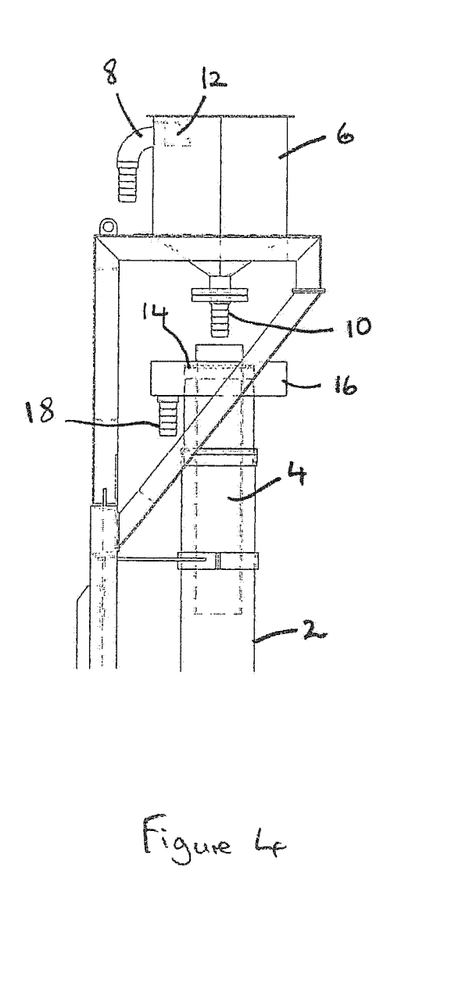
FIG. 4 is a detailed side view of an upper end of the apparatus of FIG. 1.
Figure 5:
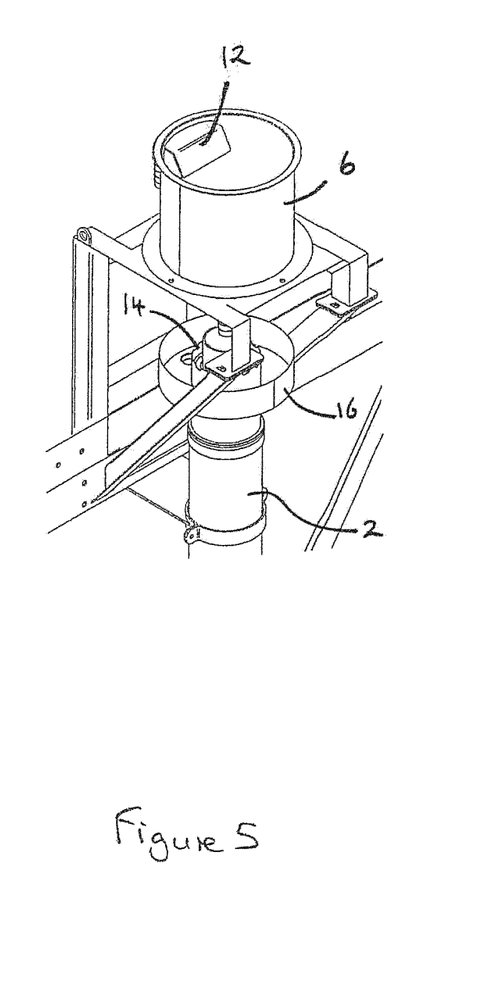
FIG. 5 is a detailed perspective view of the upper end of the apparatus of FIG. 1.
Figure 6:
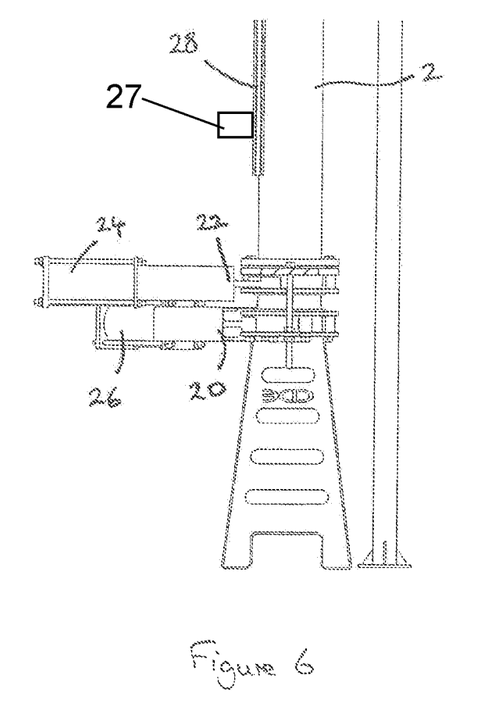
FIG. 6 is a detailed side view of a lower end of the apparatus of FIG. 1.
Figure 7:
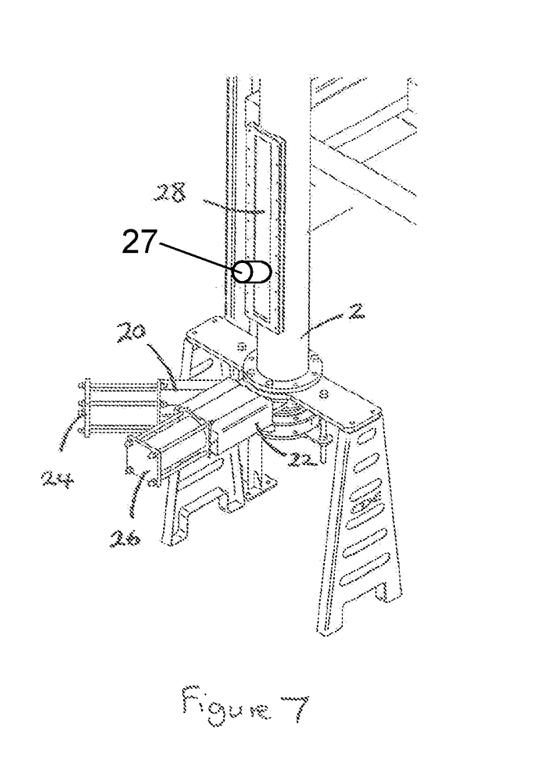
FIG. 7 is a detailed perspective view of the lower end of the apparatus of FIG. 1.
Figure 8:
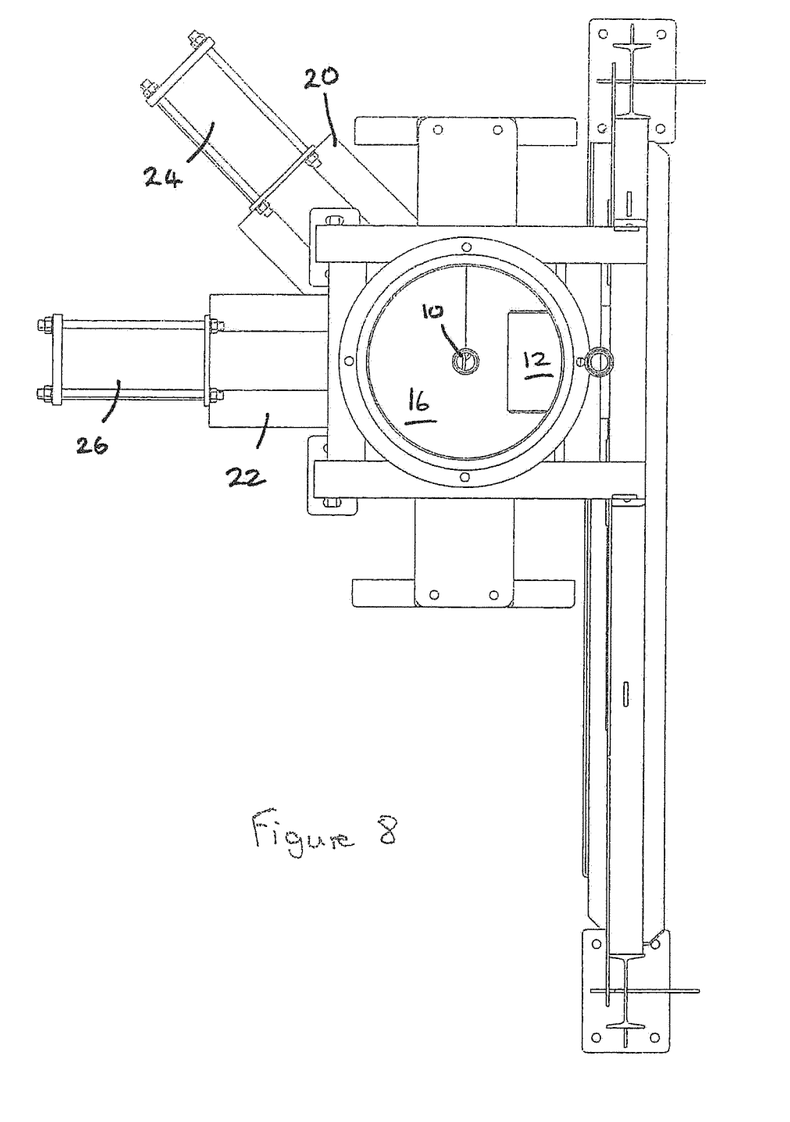
FIG. 8 is a plan view from above of the apparatus of FIG. 1.

In one embodiment it is envisaged that the porous barrier 30 may be defined by the belt material of an endless belt conveyor, vertically moveable into and out of abutment with the lower end of the column. When the conveyor is moved to its lower position, out of abutment with the lower end of the column, the belt may serve to convey the discharged fines away from the column. The suction applied to the belt material from withdrawing water from the settled fines may also serve to facilitate removal of the collected fines from the lower end of the column.

While present invention is described in relation to the removal of fines from waste water, it is envisaged that the method and apparatus according to the present invention could equally be suitable for removing suspended solids, in particular solid contaminants, from any liquid, not limited to waste water, for example to allow the liquid to be reused or recycled to simply remove contamination from the liquid to facilitate disposal thereof.

The invention is not limited to the embodiments described herein but can be amended or modified without departing from the scope of the present invention, which is intended to be limited only by the scope of the appended claims as interpreted according to the principles of patent law including the doctrine of equivalents.

The invention claimed is:

1. An apparatus for reducing the water content of waste water sludge comprising:
    a column for receiving waste water sludge;
    an outlet at a lower end of said column;
    a first closure for closing said outlet of said column;
    a controller for controlling opening and closing of said first closure, said controller being adapted to open and close said first closure to periodically discharge amounts of settled fines from said lower end of said column;
    a water outlet adapted to receive water overflowing from an upper end of said column; and
    a porous barrier for selectively closing said lower end of said column, said porous barrier communicating with a pressure reduction device for drawing water out of said lower end of said column through said porous barrier while retaining settled fines within said column.

2. The apparatus of claim 1, wherein said first closure comprises a gate valve.

3. The apparatus of claim 1, further comprising a second closure located above said first closure, said controller being adapted to close said second closure before or when opening said first closure to retain waste water sludge in said column above said second closure while settled fines below said second closure are discharged from said lower end of said column.

4. The apparatus of claim 3, wherein said second closure comprises a gate valve.

5. The apparatus of claim 1, further comprising a sensor for determining the level of settled fines within said column, said controller being adapted to control opening and closing of said first closure as a function of the level of settled fines within said column.

6. The apparatus of claim 5, wherein said controller is programmed to open said first closure to discharge settled fines from said lower end of said column when said sensor determines that the level of settled fines is at a predetermined level within said column.

7. The apparatus of claim 6, further comprising a second closure located above said first closure, said controller being adapted to close said second closure before or when opening said first closure to retain waste water sludge in said column above said second closure while settled fines below said second closure are discharged from said lower end of said column, wherein said controller is adapted to close said second closure when said sensor determines that the level of settled fines is at said predetermined level within said column.

8. The apparatus of claim 7, wherein said predetermined level is at or above the position of said second closure within said column.

9. The apparatus claim 5, wherein said sensor comprises one or more of:
    an optical sensor for detecting light transmission within said column;
    a torque sensor for determining the torque applied to stirring devices located at a predetermined height within said column; and
    a weighing device for determining the weight of settled fines within said lower end of said column.

10. The apparatus of claim 1, wherein said water outlet communicates with a peripheral weir at said upper end of said column.

11. The apparatus of claim 10, wherein said water outlet is provided in a peripheral water collection chamber extending around said upper end of said column.

12. The apparatus of claim 1, wherein an inlet pipe extends downwardly into said upper end of said column for delivering waste water sludge into said column.

13. The apparatus of claim 12, wherein said inlet pipe is arranged concentrically within said column.

14. The apparatus of claim 1, wherein said column is defined by a tubular pipe.

15. The apparatus of claim 14, wherein said tubular pipe has a constant diameter and/or cross sectional area along its length.

16. The apparatus of claim 1, wherein said column is mounted vertically or substantially vertically on a support frame.

17. The apparatus of claim 1, further comprising a second closure located above said first closure, said controller being adapted to close said second closure before or when opening said first closure to retain waste water sludge in said column above said second closure while settled fines below said second closure are discharged from said lower end of said column, wherein said controller is adapted to bring said porous barrier into a position against said lower end of said column, retaining settled fines within said column, when said second closure is closed and said first closure is open to reduce the water content of settled fines located in said column below said second closure and to subsequently displace said porous barrier away from said lower end of said column to permit discharge of settled fines from said column.

18. The apparatus of claim 17, wherein said porous barrier is defined by a belt of an endless belt conveyor adapted to receive and carry settled fines discharged from said lower end of said column.

19. A method of reducing the water content of waste water sludge comprising:
   delivering waste water sludge into a column having an outlet at a lower end of the column and a first closure for closing the outlet of the column;
   permitting fines to settle to the lower end of the column;
   periodically opening the first closure to discharge amounts of the settled fines from the lower end of the column while collecting water overflowing from an upper end of the column; and
   closing the lower end of the column with a porous barrier communicating with a pressure reduction device for drawing water out of the settled fines through the porous barrier to reduce the water content of the settled fines before discharging the settled fines from the lower end of the column.

20. The method of claim 19, further comprising closing a second closure located in the column above the first closure when or before opening the first closure to retain waste water sludge in the column above the second closure while the settled fines are discharged from the column.

21. The method of claim 20, wherein the second closure is closed to retain waste water sludge within the column and the first closure is opened to discharge an amount of the settled fines from the lower end of the column when a sensor determines that the settled fines have reached a predetermined level within the column.

22. The method of claim 21, wherein the predetermined level is at or above the level of the second closure.

23. The method of claim 19, wherein the first closure is opened to discharge an amount of the settled fines from the lower end of the column when a sensor determines that the settled fines have reached a predetermined level within the column.

* * * * *